Jan. 22, 1957 C. J. WEEMA 2,778,096
MANUFACTURE OF SEPARATOR FOR DIALYZING APPARATUS
Filed Sept. 10, 1952 2 Sheets-Sheet 1

INVENTOR.
CONSTANT JOHN WEEMA

BY

ATTORNEYS

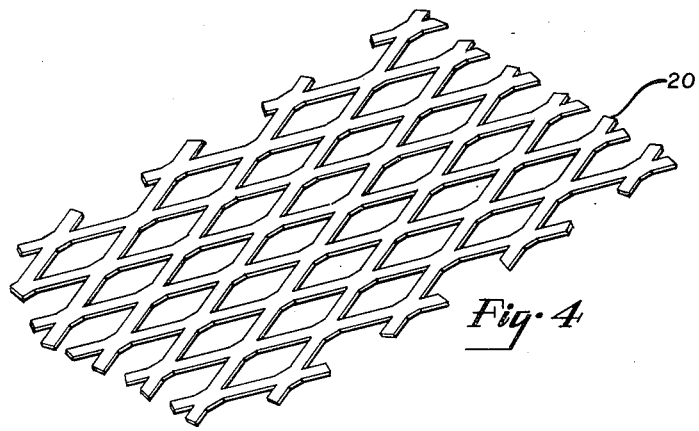
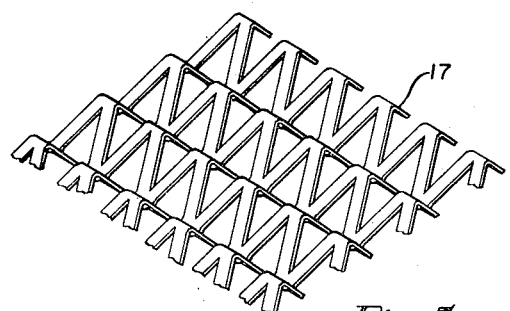
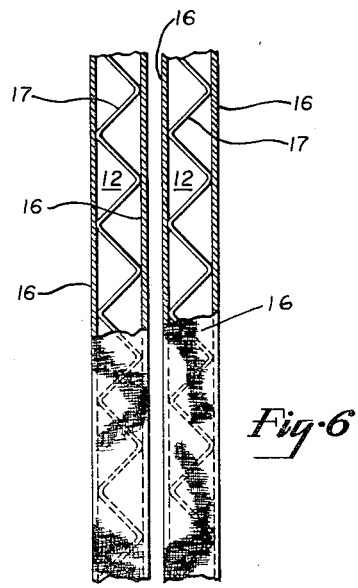

United States Patent Office 2,778,096
Patented Jan. 22, 1957

2,778,096

MANUFACTURE OF SEPARATOR FOR DIALYZING APPARATUS

Constant John Weema, Madison, Ohio

Application September 10, 1952, Serial No. 308,847

2 Claims. (Cl. 29—163.5)

My invention relates to dialyzing apparatus and more particularly to the separator for spacing apart the dialyzing diaphragms.

An object of my invention is the provision of an improved construction of a separator or spacing element for dialyzing apparatus.

Another object is the provision of an efficient and economical construction for a separator or spacing element used for separating diaphragms of a dialyzing apparatus.

Another object is the provision for a separator or spacing element made of a metal resistant to chemical reaction with the material handled by a dialytic apparatus and constructed to adapt itself to the physical properties of the metal.

Another object is the provision of a separator or spacing element for use in dialytic apparatus, which element is made of stainless steel.

Still another object is the provision of an improved method for making the separator or spacing element used in association with dialyzing diaphragms.

Other objects and a fuller understanding of my invention may be had by referring to the following description and claims, taken in conjunction with the accompanying drawing, in which:

Figure 4 is a view of the piece of metal shown in Figure 3 after it has been flattened to remove the distortions in the web or thread of the metal surrounding the openings;

Figure 5 is a view of the metal shown in Figure 4 after the flattened metal has been corrugated; and Figure 6 is an enlarged view of a portion of two adjacent dialyzing cells, each embodying my improved separator or spacing element.

Figure 1:
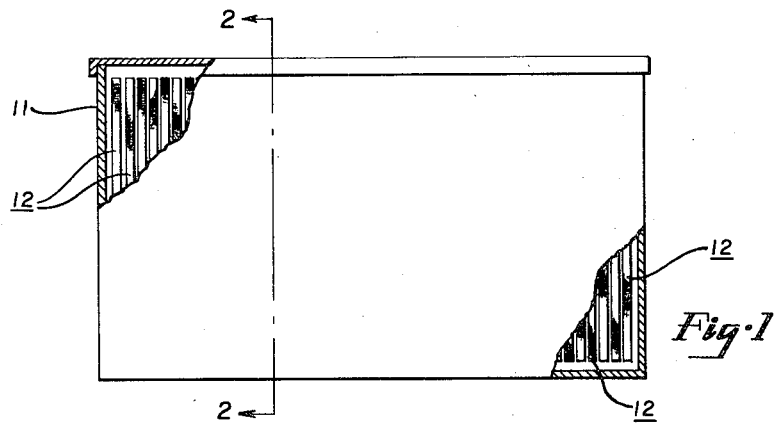
Figure 1 is a side elevational view showing dialyzing apparatus embodying my improved dialyzing cells.

In the rayon industry and in other operations, there is a need for the recovery of caustic hydroxides, such as sodium hydroxide. This involves the dialytic separation of the caustic hydroxides, such as the sodium hydroxide from impurities such as hemi-cellulose, hydroxy cellulose, oxycellulose and other organic substances which may be present in impure liquors, either in solution or in flocculent, jelly-like or colloidal conditions.

In such apparatus, diaphragms spaced from each other separate the flow of relatively pure water from the fluid from which the hydroxides are to be salvaged by dialysis through the diaphragm. It is usual to have a plurality or battery of cells arranged in series in a tank and spaced from each other. A pair of spaced diaphragms makes up a dialyzing cell. The impure liquor containing the sodium hydroxide or other caustic hydroxide passes through the inside of this cell or chamber and the water or pure liquid passes on the outside, or vice versa. Thus, in the apparatus the impure liquor to be dialyzed may pass through the tank and the relatively pure water may pass through the inside of the cells, or vice versa. In this action of dialysis, a pressure is placed upon the diaphragms which tends to rupture the diaphragms or to cause the diaphragms to come together without the required intervening space between them.

The diaphragms may be animal membranes, or may be composed of a fabric of vegetable fibers, such as cotton, as described in United States Patent No. 1,815,761 to Cerini, and treated to provide a dialyzing diaphragm through which the required dialysis may take place.

In some of the prior apparatus, one of the means used to separate or keep spaced apart the diaphragms is a mess of wire coils so interwoven or connected as to provide an open-mesh metal structure of required thickness. Because of the chemical nature of the material handled in the dialytic apparatus, many metals are subject to corrosion or chemical reaction with the fluids passing through the apparatus. For example, ordinary iron does not very well withstand the chemical action of the fluids subject to the dialytic process. For this reason, the masses of interconnected wire coils have usually been made of silver wire, as this material is appropriate for resisting chemical reaction with the fluids encountering the metal of the wire coils. However, as is well known, silver is expensive for industrial uses and the considerable amount required for separators in dialytic apparatus makes the cost extremely high.

Another material which is appropriate and well suited for resisting chemical reaction or corrosive attacks from the fluid passing through the dialyzing cells of the apparatus is stainless steel. However, stainless steel does not lend itself readily to being formed into wire coils or other wire forms. The chemical properties of stainless steel are well suited for the purpose of providing a separator for dialyzing apparatus, but its physical properties are not well suited for the forming of separators in the usual mass of wire coils as heretofore known.

I have provided a solution to the problems heretofore existing and unsolved by inventing the presently disclosed separator or spacing element. My separator or spacing element is composed of stainless steel or other metal having chemical properties which resist chemical reaction or corrosion from the fluid encountered in the dialytic apparatus. In the recovery of sodium hydroxide, I prefer the use of stainless steel as the material for the forming of my separator or spacing element. I first provide a flat sheet of the chosen metal, preferably stainless steel. This is pierced or perforated to form a multitude of uniformly distributed small slits or longitudinal openings through the sheet of metal. I then stretch the metal laterally of the slits or longitudinal openings to widen and enlarge the slits to thus form a plurality of relatively large openings separated by webs of metal. This forms an open mesh-work of metal and is in a condition well known in the metalwork art. By the piercing and stretching operation the webs of metal become distorted so that the intersecting portions of the webs or threads of metal defining the openings are disposed at an angle to the plane of the sheet of metal. This makes an irregular and somewhat rough face on the sides of the stretched sheet of metal. Also, by reason of the transverse disposition of the intersecting portions of the metal, the sheet of metal has become rather rigid and resists bending.

After this stretching operation, I next flatten the sheet of metal to replace the distorted portions of the metal into the original plane of the metal sheet. This flattening may be done by rolling or by a pressing operation. After this flattening operation, the opposite sides of the perforate metal sheet are flat and smooth and the sheet of metal lends itself to further bending.

The next step of forming my separator or spacing element is to corrugate the flattened and perforate sheet. This corrugating may be done by a rolling operation or by pressing the sheet from opposite sides. In the corrugating operation the metal sheet is recurrently bent back and forth between two spaced and parallel planes so that some portions are disposed at the spaced parallel planes and intermediate portions interconnect these spaced portions. After the corrugations are made, then there is a metal structure which has passageways which are disposed both transversely of the structure from one side to the other and also laterally of the structure. By this arrangement, fluid may flow through the structure in all directions.

Figure 2:
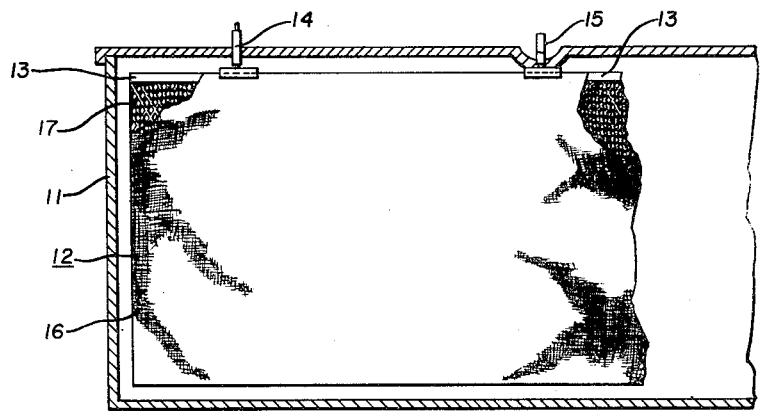
Figure 2 is a cross-sectional view taken through the line 2—2 of Figure 1 and showing, partly in section, one of my dialyzing cells embodying my improved separator or spacing element.

In the drawings, the dialytic apparatus is shown in elementary form in Figures 1 and 2. The apparatus comprises a tank 11 in which there are a plurality of dialytic cells 12 spaced apart and arranged in series the length of the tank to form a battery of cells. The interiors of the several cells are interconnected to form one fluid system and the exterior of the cells within the tank forms another fluid system. The pure water passes through one fluid system and the impure liquors containing the hydroxides to be salvaged pass through the other fluid system.

Each cell 12 comprises a separator or spacing element 17, a portion of which is shown in Figure 5 and is also illustrated in Figure 6. The rectangular piece of metal forming the separator 17 is carried on a supporting bar or rod 13 extending across the top of the separator. Also carried upon the bar 13 are two spaced dialyzing diaphragms 16. Three dialyzing diaphragms 16 are formed as an envelope or flat bag containing the respective separators 17. The edges of the diaphragms are closed or interconnected so that the cell comprised of the separator 17 and oppositely disposed diaphragms is enclosed. Thus fluid within the cell passing through the openings of the separator and between the adjacent diaphragms is separated or divided from fluid outside of the cell.

Bracket supports 14 connected to the supporting bar 13 hang or support each cell in position. Fluid connections 15 interconnect the interiors of the respective cells to form a fluid system so that the interiors of the several cells form one of the fluid systems of the apparatus.

Figure 3:
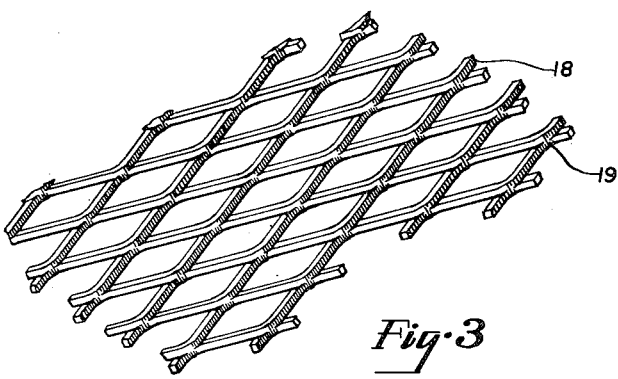
Figure 3 is a perspective view of a piece of sheet metal such as stainless steel after it has been pierced and stretched.

Figure 3 illustrates a sheet of metal, such as stainless steel, after slits have been formed and the metal has been stretched. In this condition, the stretched metal 18 is in a condition well known in the metalworking art. The webs have portions 19 which are distorted or disposed at an angle to the plane of the sheet. When in the condition of Figure 3, the sheet of metal is relatively rigid and resists bending or corrugating. Also the opposite sides of the sheet of metal are irregular and uneven. In this condition, the uneven or irregular nature of the metal could rupture or wear weak spots in the diaphragm. In the case of treated fabric, worn spots provide "leaks" in the diaphragm for dialytic purposes.

In Figure 4, there is shown the sheet of metal which previously was shown in Figure 3 after it has been flattened. The flattened metal denoted by the reference character 20 has opposite sides which are smooth and regular, the distortions 19 having been eliminated by the flattening operation.

In Figure 5 a portion of the separator 17 is shown. In the condition shown in Figure 5, the sheet of metal previously in the condition of Figure 4 has been corrugated or recurrently bent back and forth between two spaced parallel planes, thus providing open passageways in a plurality of directions.

In Figure 6, there are shown two separators 17 enclosed by opposite diaphragms 16, thus forming two spaced dialytic cells. The separators 17 prevent the pair of diaphragms making up a cell from moving laterally inward toward the separators. Thus the separators form a mechanical barrier or resistance to lateral movement or displacement of the diaphragms under pressure exerted by the fluid. However, the separators permit free flow of fluid because of the multitude of variously directed passageways through the separators. The chemical properties of the metal comprising the separators is taken advantage of at the same time that the structure is adapted to the physical properties and limitations of the metal.

The present disclosure contains the description set forth in the appended claims, as well as the foregoing description and drawing.

Although this invention has been described in its preferred form with a certain degree of particularity, it is understood that the present disclosure of the preferred form has been made only by way of example and that numerous changes in the details of construction and the combination and arrangement of parts may be restorted to without departing from the spirit and scope of the invention as hereinafter claimed.

What is claimed is:

1. The process of making a spacing element for the flexible dialyzing diaphragm of a dialyzing apparatus, comprising the steps of providing a sheet of metal resistant to the material encountered by the spacing element in the apparatus; piercing said sheet to provide a plurality of spaced openings; laterally stretching said metal to enlarge said openings; flattening the metal into a plane to eliminate the distortions of the metal caused by said stretching; and corrugating the flattened sheet of metal, along corrugation lines bisecting laterally adjacent openings.

2. The process of making a separator for dialyzing diaphragms comprising the steps of: providing a sheet of stainless steel; forming a plurality of laterally disposed and longitudinally extending slits in the said sheets; laterally stretching the steel to enlarge the slits to provide an open mesh of diamond-shaped openings bounded by said steel; flattening the steel to replace the steel into the flat plane of said sheet; and thereafter corrugating the sheet of steel along corrugation lines substantially passing through opposite corners of laterally disposed openings in said sheet.

References Cited in the file of this patent

UNITED STATES PATENTS

| | | |
|---|---|---|
| 1,080,418 | Clark | Dec. 2, 1913 |
| 1,899,080 | Dalgleish | Feb. 28, 1933 |
| 2,225,024 | Weber | Dec. 17, 1940 |
| 2,352,732 | Nugent | July 4, 1944 |
| 2,602,519 | Raper | July 8, 1952 |
| 2,636,572 | Fleisher | Apr. 28, 1953 |
| 2,664,395 | Marchand | Dec. 29, 1953 |
| 2,677,466 | Lowe | May 4, 1954 |

FOREIGN PATENTS

| | | |
|---|---|---|
| 425,317 | Great Britain | Mar. 12, 1935 |